Figure 6:
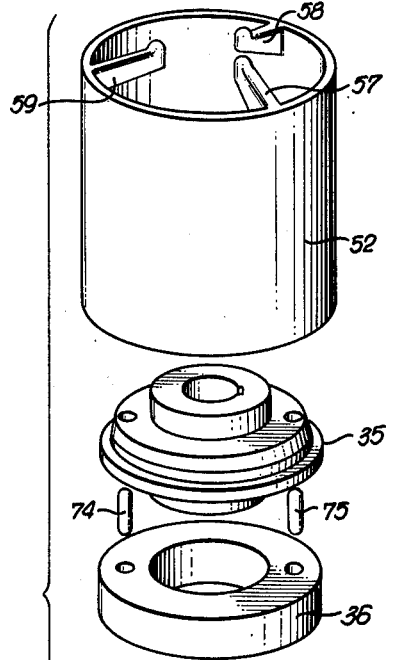
Figure 4:
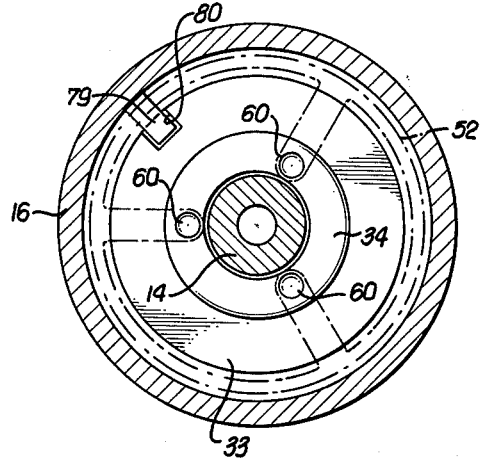
Figure 5:
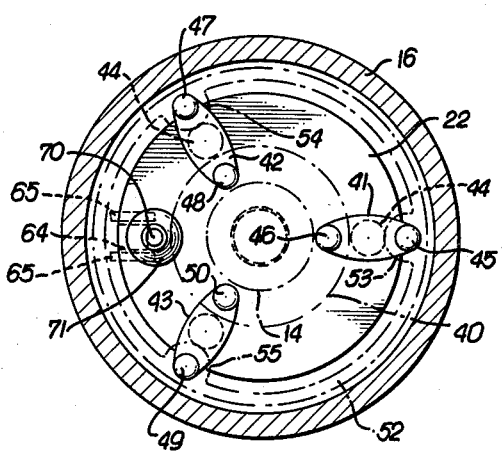

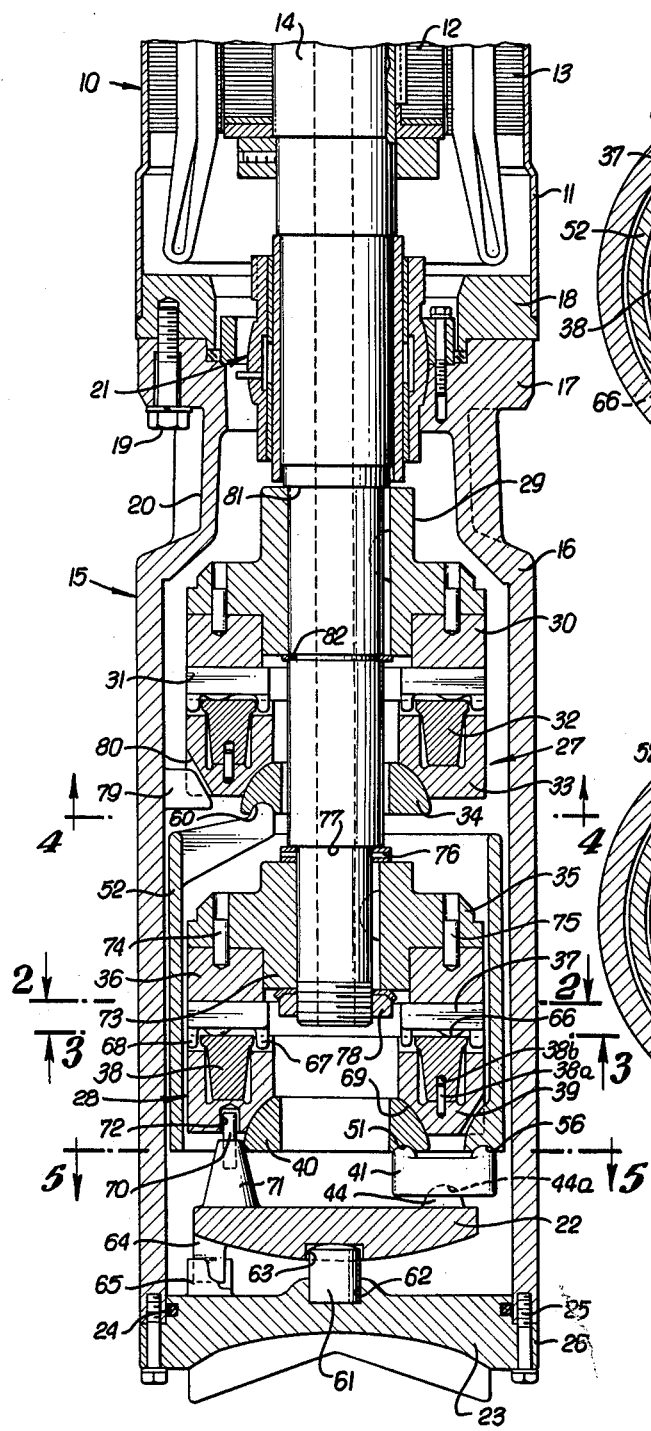

May 11, 1965

P. S. KOMOR 3,183,048

MULTIPLE THRUST BEARING STRUCTURE

Filed Feb. 18, 1963

2 Sheets-Sheet 2

PETER S. KOMOR
INVENTOR.

BY Flam and Flam

ATTORNEYS.

Patent 3,183,048 — Multiple Thrust Bearing Structure

3,183,048
MULTIPLE THRUST BEARING STRUCTURE
Peter S. Komor, Los Angeles, Calif., assignor to Emerson Electric Co., a corporation of Missouri
Filed Feb. 18, 1963, Ser. No. 259,294
1 Claim. (Cl. 308—160)

This invention relates to a thrust bearing of the tilting shoe type for a submersible pump motor, such as shown, for example, in United States Letters Patent Nos. 2,721,774 and 2,727,795 issued to Frederick O. Luenberger on October 25, 1955 and December 20, 1955, respectively, both entitled "Thrust Bearing Structure."

The thrust rating of such bearing structures depends upon the combined operating area of the shoes upon which the rotating part rests. This combined area is ordinarily limited by the diameter of the well hole in which the submersible unit is suspended.

The primary object of this invention is to make it possible to add thrust bearing capacity whereby a heavy load can be sustained irrespective of diameter restrictions. For this purpose, a number of bearing structures are provided one above the other.

Another object of this invention is to provide a multiple thrust bearing structure of this character incorporating means for automatically equalizing the thrust load whereby the rating of the structure closely approaches twice the rating of the individual units.

Another object of this invention is to provide a multiple thrust bearing that makes use of many parts conventionally used in unitary thrust bearing structures.

This invention possesses many other advantages, and has other objects which may be made more clearly apparent from a consideration of one embodiment of the invention. For this purpose, there is shown a form in the drawings accompanying and forming a part of the present specification, and which drawings, unless as otherwise indicated, are true scale. This form will now be described in detail, illustrating the general principles of the invention; but it is to be understood that this detailed description is not to be taken in a limiting sense, since the scope of this invention is best defined by the appended claim.

Referring to the drawings:

FIGURE 1 is a longitudinal sectional view of a thrust bearing structure incorporating the present invention, a portion of the submersible motor being likewise shown in sections;

FIGS. 2, 3, 4 and 5 are sectional views taken along planes corresponding to lines 2—2, 3—3, 4—4 and 5—5 of FIG. 1; and FIG. 6 is an exploded view showing some of the parts of the bearing structure.

In FIG. 1 there is illustrated a submersible motor 10 having an outer shell or casing 11. This casing 11 may be attached to the casing of a pump located above the motor 10, and the pump may in turn be suspended by suitable means in a well.

The motor 10 has a rotor 12 and a stator structure 13. The rotor 12 and the pump runner (not shown) are both supported upon a shaft 14. A very substantial downward thrust may be imposed upon this shaft.

In order to support the shaft 14 and transfer its thrust to the motor casing 11, the pump casing and the other means by the aid of which the submersible structure is suspended, a thrust bearing structure 15 is provided. The thrust bearing structure 15 has a generally cylindrical housing 16 provided with a mounting flange 17 at its upper end for attachment to the end bracket 18 of the motor structure 10. Suitable cap screws 19 may be provided for this purpose which are accessible at inwardly offset portions 20 of the bearing structure housing.

The shaft 14 extends downwardly through the end motor bracket 18 through the flange 17 and into the hollow interior of the housing 16. A sleeve bearing structure 21 attached to the flange 17 supports the shaft 14 against lateral movement while allowing for shaft flexure and a slight deviation of the shaft axis.

The thrust imposed upon the shaft 14 is transferred to the housing 16 through a tiltable base 22 that rests upon a circular cover or cap 23 at the lower end of the housing 16. The cap 23 has a reduced inner end that fits in the end of the housing. An O-ring 24 carried by this reduced extension forms a suitable seal. Screws 25 in the flange 26 of the cap secure the cap in place.

Two separate bearing structures generally designated at 27 and 28 are both supported upon the base 22. The bearing structure 27 is located above the bearing structure 28.

The structure 27 includes as elements in vertical array a flange 29, a thrust ring 30, a series of bearing shoes 31, a series of equalizing arms 32, a retainer 33, and finally a supporting member or ring 34. The bearing structure 28 incorporates similar elements, namely, a flange 35, a thrust collar 36, a series of bearing shoes 37, a plurality of equalizing arms 38, a retainer 39, and finally a supporting ring 40.

The flanges 29 and 35 at spaced positions along the shaft 14 serve to transmit portions of the shaft thrust respectively to the bearing structures 27 and 28 and ultimately to the supporting rings 34 and 40. The flange 35 forming the uppermost part of the lower bearing structure 28 is located just beneath the supporting ring 34 forming the lowermost part of the upper bearing structure 27.

The base 22 supports both supporting rings 34 and 40. This is accomplished by the aid of a plurality of rocker arms or balancing beams 41, 42 and 43 located equiangularly upon the base 22 and as shown in FIG. 6. Each rocker is tiltably mounted upon a bearing in the form of a hemispherical upward protruberance as at 44 formed on the upper surface of the base 22. Each rocker arm is provided with a hemispherical recess in its undersurface as at 44a that fits the corresponding protuberance.

The upper surface of each rocker arm in turn has two bearing protuberances at 45 and 46, 47 and 48, and 49 and 50. The two bearings of each rocker arm are located at opposite ends and equidistant from the recess 44a. Thus equal downward forces at the respective bearing protuberances will counterbalance each other.

The rocker arms 41, 42 and 43 are radially oriented and the inner bearing protuberances 46, 48 and 50 fit three downwardly directed equiangularly oriented recesses as at 51 formed in the supporting ring 40 of the lower bearing structure. Accordingly, the thrust of the lower bearing 28 is transmitted to the rocker arms 41, 42 and 43, and thus to the base 22.

The outer protuberances 45, 47 and 49 of the rocker arms 41, 42 and 43 are connected to the supporting ring 34 of the upper bearing structure 27. For this purpose, a transfer link 52 is provided. This transfer link is in the form of a hollow, open-ended cylinder that encompasses, with clearance, the lower bearing structure 28. At its lower end, the transfer link 52 has three equiangularly oriented embossments 53, 54 and 55 (FIG. 5) on its inner side provided with downwardly disposed recesses as at 56 for engagement with the outer bearing protuberances 45, 47 and 49 of the rocker arms 41, 42 and 43.

The upper end of the transfer link is provided with three radially inwardly directed arms 57, 58 and 59 (see FIG. 6), the inner ends of which are situated beneath the supporting ring 34. These inner ends of the arms 57, 58 and 59 are provided with hemispherical or suitably rounded bearing protuberances to fit the equiangularly located recesses as at 60 (see FIG. 4) formed in the undersurface of the supporting ring 34.

The thrust sustained by the bearing structure 27 if equal to the thrust sustained by the bearing structure 28 results in a balanced condition of the rocker arms 41, 42 and 43. If any imbalance occurs in the respective thrusts sustained by the bearing structures, the links 41, 42 and 43 correspondingly tilt and thus transfer the load of the respective bearing structures 27 and 28 one to the other in accordance with the preponderance of thrust. Thereby the thrust load is equalized.

The base 22 is tiltably mounted by a pin 61 accommodated in opposing recesses 62 and 63 in the upper and lower surfaces of the end cap 23 and base 22 respectively.

The base 22 is restrained from angular movement by the aid of a depending lug 64 at the outer margin of the base 22 that fits between a clevis 65 formed on the cap 23. The bearing structures shown by way of illustration will now be described in further detail. Both bearings are similar.

The bearing shoes 37 of the lower bearing structure 28 are in this instance six in number. Their upper surfaces are flat in order to be engaged by the rotary thrust collar 36. In a well understood manner, the individual shoes accommodate themselves to the thrust collar 36. A film of the liquid that fills the housing 16 enters between the thrust collar 36 and the upper surface of each shoe 37. Each shoe is tiltably mounted upon one of the three equalizing arms 38 and by the aid of a generally curved or spherical bearing protuberance as at 66 formed on its undersurface (see FIGS. 2 and 3). The equalizing arms project between inner and outer depending lugs 67 and 68 provided on each of the shoes 37. Two shoes being supported on each equalizing arm, the thrust load of the respective shoes tends to be distributed due to the tiltable mounting of the equalizing arms 38 themselves.

The equalizing arms 38 have depending arcuate lugs that fit within a circularly extending channel in the retainer 39. Pins 38a mounted in the bottom of the retainer 39 project into receses 38b of the equalizing arms thereby preventing the equalizing arms from rotating in the retainer channel.

In order to restrain the shoes 37 against rotation, the retainer 39 has slots 39a (FIGS. 2 and 6) in which the depending lugs 67 and 68 of the shoes are received. The retainer 39 in turn is restrained from rotation by means hereinafter to be described.

The retainer 39 is tiltably mounted upon the supporting ring 40 to allow for shaft deflection. For this purpose, the upper surface of the ring 40 is formed as a spherical segment and the retainer 39 is provided with a corresponding recess 69 in its undersurface that fits on the ring 40.

The retainer 39 is restrained from angular movement by the aid of a pin 70 mounted in a boss 71 on the upper surface of the base 22. The pin 70 enters a downwardly opening recess 72 of the retainer 39.

The thrust collar 36 is attached to the flange 35. Thus the collar telescopes over a hub portion 73 of the flange 35 and is connected thereto for rotation therewith by the aid of a pair of pins 74 and 75. The thrust collar 36 transfers part of the shaft thrust to the bearing shoes 37.

The upper bearing structure is similar.

The flange 35 is accommodated on the very end of the shaft 14. Shims 76 are interposed between the upper end of the hub of the flange 35 and a downwardly extending shoulder 77 of the shaft. By providing proper shims, the position of the rocker arms 41, 42 and 43 can be adjusted to horizontal. A lock nut 78 holds the flange in assembled relationship.

An inwardly extending projection 79 formed on the bearing housing 16 is accommodated in a recess 80 formed in the retainer 33 for purposes of restraining its rotation.

The flange 29 of the upper bearing structure abuts a downwardly extending shoulder 81 formed on the shaft and is maintained in assembled relationship by the aid of a snap ring 82.

Further thrust bearing structures could also be added. For this purpose, the base 22 could be deleted and the shaft 14 extended downwardly. In place of the base 22 a second link similar to the link 52 could be provided, with its upper end engaging in the recesses 44a of the rocker arms 41, 42 and 43. A second set of rocker arms could then be provided in which the leverage ratio, instead of being 1 to 1, as is the case with the rocker arms 41, 42 and 43, could be 2 to 1. The lower end of the second link could then bear on the short ends of the rockers of the second set, and the third bearing structure on the other ends. A common base, such as the base 22, could then be provided for the second set of rocker arms. Other arrangements are also possible.

The inventor claims:

In a multiple bearing for a submersible structure having a vertical shaft: a casing; a first bearing structure having a plurality of tiltable shoes spaced about the axis of said shaft, said first bearing structure having a retainer for nonrotatably supporting said shoes; a second bearing structure having a plurality of tiltable shoes spaced about the axis of said shaft, said second bearing structure having a retainer for nonrotatably supporting said shoes; the first bearing structure being located above the second bearing structure; a pair of thrust members carried by the shaft for transmitting a portion of the shaft thrust to the shoes of the respective bearing structures; each of said bearing structures having a supporting ring having a convex surface in the form of a spherical zone fitting the corresponding retainer for sustaining the thrust of the corresponding bearing structure; a base below the bearing structures; a plurality of rocker arms equiangularly spaced about the base; said rocker arms being mounted on the base for tilting movement in planes substantially radial to the shaft axis, and having inner ends and outer ends; the inner ends engaging the supporting ring of the second bearing structure; a sleeve-like link surrounding the second bearing structure and having one end engaging the outer ends of the rocker arms and the other end engaging the supporting ring of the first bearing structure; a projection carried by the casing above the link and engaging the retainer of the first bearing structure at a place spaced radially outwardly of the supporting ring of the said first bearing structure for limiting angular movement of said retainer; and a projection carried by the base and extending upwardly between the rocker arms and engaging the retainer of the second bearing structure at a place spaced radially outwardly of the supporting ring of the said second bearing structure for limiting angular movement of the said ring.

References Cited by the Examiner

FOREIGN PATENTS 274,401  5/14  Germany.

ROBERT C. RIORDON, *Primary Examiner.*

FRANK SUSKO, *Examiner.*